US012008166B1

(12) United States Patent
Buttolo et al.

(10) Patent No.: US 12,008,166 B1
(45) Date of Patent: Jun. 11, 2024

(54) AUTOMATIC IN-VEHICLE HAPTIC FEEDBACK AND FORCE TOUCH ADJUSTMENT SYSTEMS AND METHODS

(71) Applicant: Ford Global Technologies, LLC, Dearborn, MI (US)

(72) Inventors: Pietro Buttolo, Dearborn Heights, MI (US); Neha Singhal, Northville, MI (US); Biaohe Guo, Northville, MI (US); Mark Larry, Macomb, MI (US); Kenneth Michael Mayer, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/331,307

(22) Filed: Jun. 8, 2023

(51) Int. Cl.
*G06F 3/01* (2006.01)
*B60K 35/00* (2006.01)
*G06F 3/041* (2006.01)
*B60K 35/10* (2024.01)
*B60K 35/25* (2024.01)
*B60K 35/85* (2024.01)

(52) U.S. Cl.
CPC .............. *G06F 3/016* (2013.01); *B60K 35/00* (2013.01); *G06F 3/0414* (2013.01); *B60K 35/10* (2024.01); *B60K 35/25* (2024.01); *B60K 35/85* (2024.01); *B60K 2360/1438* (2024.01); *B60K 2360/589* (2024.01); *G06F 2203/014* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 10,866,645 B2 | 12/2020 | Ding et al. | |
| 11,256,331 B1 | 2/2022 | Diest et al. | |
| 2015/0324049 A1 | 11/2015 | Kies et al. | |
| 2017/0021762 A1 | 1/2017 | Daman | |
| 2017/0240185 A1* | 8/2017 | Li | G08B 7/06 |
| 2017/0253252 A1 | 9/2017 | Donnelly et al. | |

(Continued)

OTHER PUBLICATIONS

Hendrik Richter et al., Haptouch and The 2+1 State Model: Potentials of Haptic Feedback on Touch Based In-Vehicle Information Systems, Proceedings of the Second International Conference on Automotive User Interfaces and Interactive Vehicular Applications, AutomotiveUI 2010, Nov. 11-12, 2010, pp. 72-79.

*Primary Examiner* — Toan H Vu
(74) *Attorney, Agent, or Firm* — Frank Lollo; Eversheds Sutherland (US) LLP (57) ABSTRACT

A vehicle having a touch device configured to receive user inputs is disclosed. The touch device may include a haptic component configured to provide haptic feedback to a user and a force touch component configured to detect force applied by the user on the touch device and actuate the touch device. The vehicle may further include a transceiver and a processor. The transceiver may be configured to receive road information on which the vehicle may be traversing. The processor may be configured to obtain the road information from the transceiver, determine road condition based on the road information, and adjust parameters associated with the haptic component or the force touch component based on the road condition.

20 Claims, 8 Drawing Sheets

(56) References Cited

U.S. PATENT DOCUMENTS

| | | | |
|---|---|---|---|
| 2019/0210591 A1* | 7/2019 | Low | B60W 50/085 |
| 2019/0351918 A1* | 11/2019 | Maeng | H04W 4/023 |
| 2021/0099639 A1* | 4/2021 | Bartow | G02C 3/003 |
| 2022/0221936 A1* | 7/2022 | Park | G06F 3/016 |
| 2022/0383741 A1* | 12/2022 | Sanchez | G06F 3/016 |
| 2023/0386159 A1* | 11/2023 | Gilg | G06F 3/011 |
| 2024/0051573 A1* | 2/2024 | Clawson | B60W 30/0956 |
| 2024/0061505 A1* | 2/2024 | Li | G06F 3/016 |

* cited by examiner

AUTOMATIC IN-VEHICLE HAPTIC FEEDBACK AND FORCE TOUCH ADJUSTMENT SYSTEMS AND METHODS

FIELD

The present disclosure relates to vehicles and more particularly to automatic haptic feedback and force touch adjustment systems and methods for touch devices in vehicles.

BACKGROUND

Haptic and force touch technologies are used in various products, such as consumer electronics, automobiles, etc. The automobile industry incorporates these technologies in vehicle electronic devices, e.g., displays, buttons, smart surfaces, and/or the like.

Typically, the haptics technology simulates the sense of touch to provide feedback to the user. The force touch technology distinguishes between various levels of forces applied to a touch screen surface (e.g., a display screen surface) and performs one or more actions based on the level of applied force. Specifically, the force touch technology distinguishes between a hard-press and a light-press and performs the actions accordingly.

A user may adjust settings or parameters associated with haptics and/or force touch components present in consumer electronics, automobiles, etc. based on user preferences. Typically, the user adjusts the settings occasionally and may not make the adjustments frequently based on different environmental conditions in which the user may be located.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes systems and methods to facilitate control of a touch device in a vehicle. Specifically, the present disclosure describes automatically adjusting operational parameters associated with a haptic component and/or a force touch component disposed in the touch device based on road conditions of a road on which the vehicle may be travelling. In some aspects, the system may be configured to obtain road information associated with the road on which the vehicle may be travelling from one or more components located inside or outside the vehicle. Responsive to obtaining the road information, the system may determine or assess road conditions based on the road information. The road conditions may be indicative of whether the road is smooth, bumpy, etc. The system may be further configured to adjust parameters associated with the haptic component and/or the force touch component based on the road condition to enhance user convenience of operating the touch device.

In some aspects, the parameters associated with the haptic component may include, for example, intensity of haptic feedback. Further, the parameters associated with the force touch component may include, for example, a minimum force requirement for touch device actuation, a minimum touch time duration on the touch device for touch acceptance, and/or the like.

In some aspects, the system may obtain the road information from one or more vehicle components, including, but not limited to, a vehicle camera, an accelerometer, a navigation receiver, the touch device, and/or the like. For example, the system may obtain road images from the vehicle camera, vehicle vibration from the accelerometer, GPS location from the navigation receiver, signal information (or raw signal associated with a touch operation) from the touch device, and/or the like. One or more of the road images, vehicle vibration, GPS location, signal information, etc. may constitute the road information. In additional aspects, the system may receive the road information from external server(s).

The system may be further configured to use a pre-stored mapping of the road condition with the parameters associated with the haptic component and the force touch component to adjust the parameters. The system may obtain the pre-stored mapping from a system memory responsive to determining the road condition and may adjust the parameters based on the pre-stored mapping. In some aspects, the system may adjust the parameters associated with either one of the haptic component or the force touch component. In other aspects, the system may adjust the parameters associated with both the haptic component and the force touch component.

The present disclosure discloses a system and method to automatically adjust the parameters associated with the haptic component and/or the force touch component. For example, the system may decrease haptic feedback intensity when the vehicle may be travelling on a smooth road, for which a user may require only slight haptic feedback. Similarly, the system may increase the haptic feedback intensity when the vehicle may be travelling on a bumpy road, for which the user may require strong haptic feedback. By making these adjustments automatically, the system enhances user convenience of operating the touch device. In a similar manner, the system may increase or decrease the minimum force requirement and time duration of touch acceptance based on the road conditions to enhance user experience of operating the touch device.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
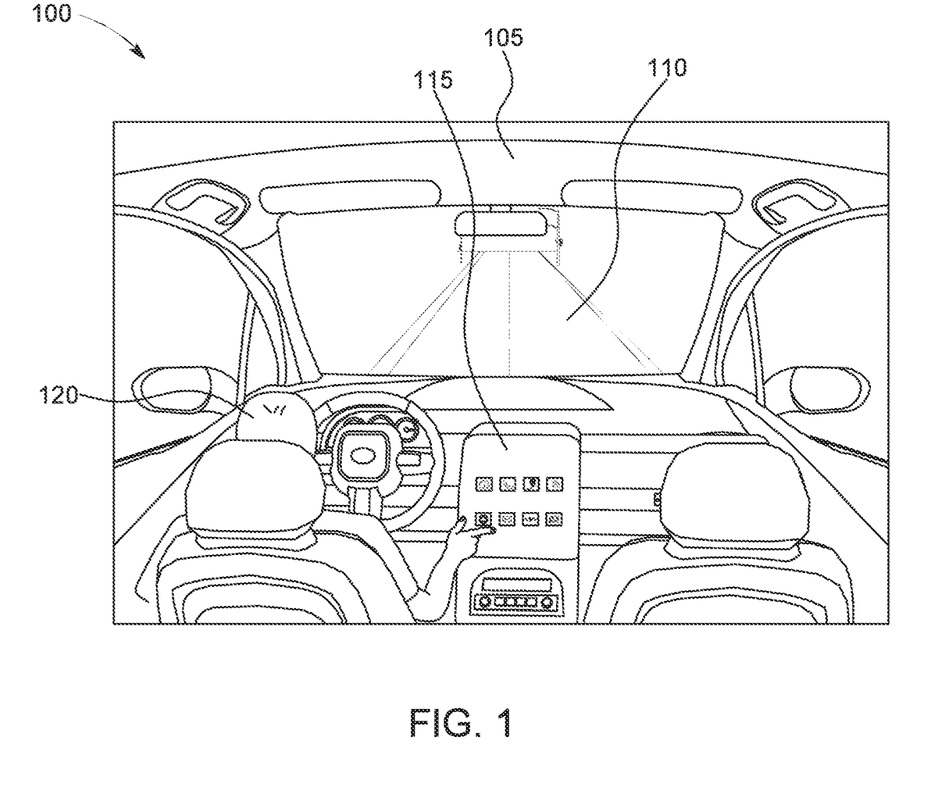
FIG. 1 depicts an environment in which techniques and structures for providing the systems and methods disclosed herein may be implemented.

FIG. 1 depicts an example environment 100 in which techniques and structures for providing the systems and methods disclosed herein may be implemented. The environment 100 may include a vehicle 105 that may be travelling on a road 110. The vehicle 105 may be a car, a truck, a van, a truck trailer, and/or the like. The vehicle 105 may include any powertrain, such as, for example, a gasoline engine, one or more electrically-actuated motor(s), a hybrid system, etc. Furthermore, the vehicle 105 may be a manually driven vehicle and/or be configured and/or programmed to operate in a fully autonomous (e.g., driverless) mode (e.g., Level-5 autonomy) or in one or more partial autonomy modes which may include driver assist technologies.

The vehicle 105 may include a touch device 115 that may be configured to receive user inputs from a user 120 and perform one or more functions based on the user inputs. The user 120 may be a vehicle driver (as shown in FIG. 1) or a passenger. The touch device 115 may include a touch display screen, buttons, a smart surface, and/or the like and may be disposed anywhere in a vehicle interior portion such as an infotainment system (as depicted in FIG. 1 and shown as infotainment system 240 in FIG. 2), steering wheel, gear knob, etc. The touch device 115 may be configured to receive user inputs and perform various functions to control operations of one or more vehicle components, including, but not limited to, air conditioning, music player (e.g., audio and/or video player), windows, doors, etc.

In some aspects, the touch device 115 may incorporate haptics and/or force touch technologies. Specifically, the touch device 115 may include a haptic component (shown as haptic component 242 in FIG. 2) that may be configured to provide haptic feedback to the user 120 when the user 120 performs a touch operation on the touch device 115 (e.g., when the user 120 touches a touch screen interface associated with the touch device 115). The haptic component may be configured to simulate the sense of user touch to provide feedback to the user 120. In some aspects, the haptic component may include an actuator that may vibrate the touch screen interface or touch device surface to provide the feedback to the user 120 when the user 120 touches the touch screen interface. The user 120 may feel strong vibration when the intensity of haptics generated by the touch device 115/haptics component may be high or at an increased level. Similarly, the user 120 may feel mild vibration when the intensity of haptics generated by the touch device 115/haptics component may be low or at a decreased level. In further aspects, the haptic component may include integrated/independent sensors that generate haptics. In an exemplary aspect, the user 120 may experience a "stickier" touch screen surface when the intensity of haptics generated by the touch device 115/haptics component may be high or at an increased level, and vice-versa for low intensity haptics.

The touch device 115 may further include a force touch component (shown as force touch component 244 in FIG. 2) that may be configured to detect force applied by the user 120 on the touch device 115 (e.g., the touch screen interface) and perform one or more operations based on the detected force (e.g., and/or actuate the touch device 115). Specifically, the force touch component may be configured to distinguish between the various levels of forces (e.g., a hard-press or a light-press) applied on the touch device 115 and perform the operations accordingly. The force touch component may include sensor(s) that may be configured to detect pressure applied by the user 120 on the touch device 115. In some aspects, the sensors may be integrated to a touch screen surface/interface backside. In other aspects, the sensors may be integrated into touch screen surface layers.

The vehicle 105 may further include a touch device management unit or "TDMU" (shown as TDMU 208 in FIG. 2) that may be configured to automatically control the haptic component and the force touch component in different conditions in which the vehicle 105 may be travelling. Specifically, the TDMU may be configured to automatically change parameters associated with the haptic component and/or the force touch component based on road conditions associated with the road 110. The TDMU may be configured to obtain road information associated with the road 110 from one or more components interior or exterior to the vehicle 105, and determine road conditions based on the road information. The details of road condition determination are described below in conjunction with FIGS. 2 and 3.

Responsive to determining the road condition, the TDMU may be configured to adjust parameter(s) associated the haptic component and the force touch component to provide an enhanced user experience to the user 120, when the user 120 performs a touch operation on the touch device 115. The details of parameter adjustment are described below in conjunction with FIG. 2.

The vehicle 105 and/or the user 120 may implement and/or perform operations, as described here in the present disclosure, in accordance with the owner manual and safety guidelines.

Figure 2:
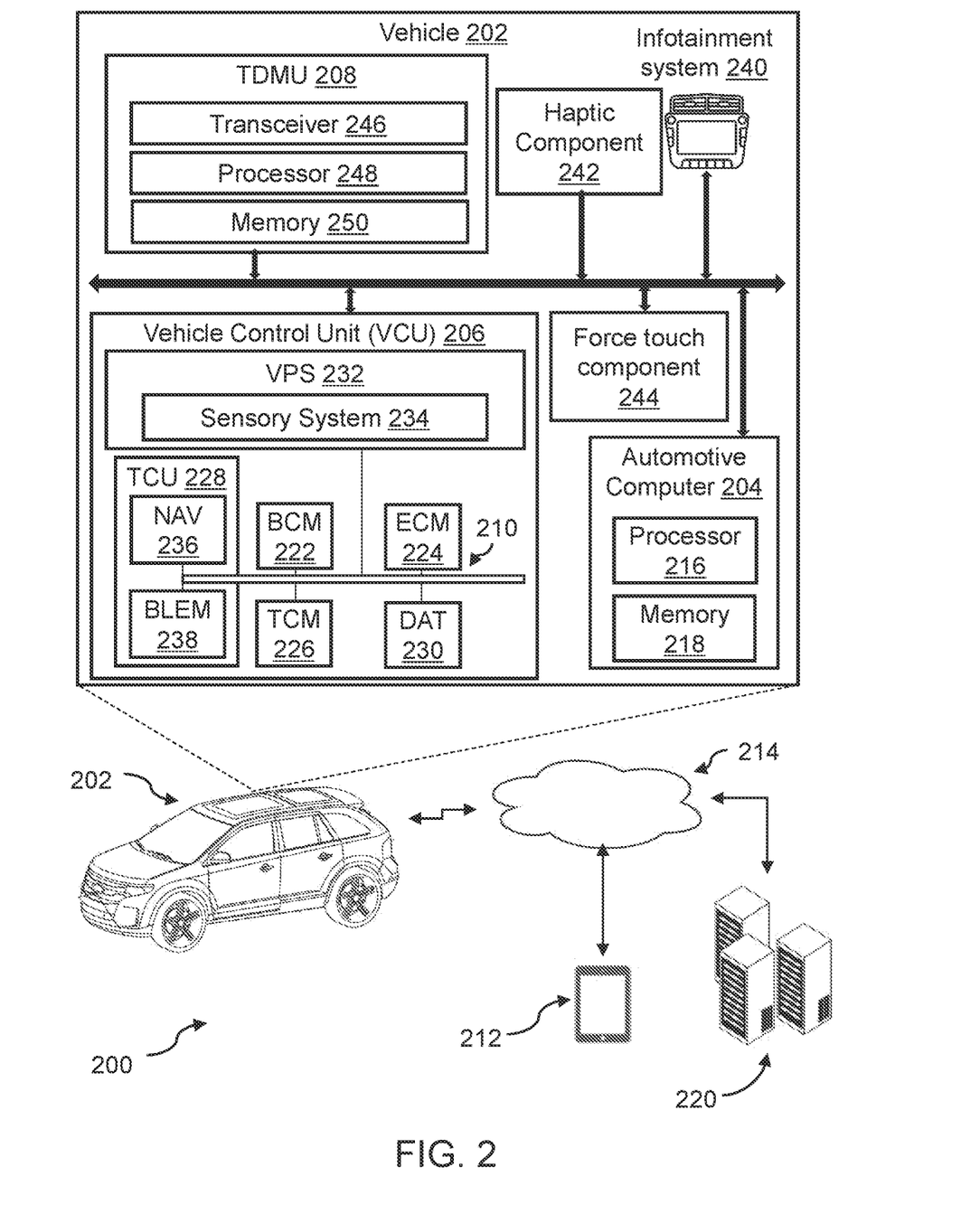
FIG. 2 depicts a block diagram of a system to facilitate control of a touch device in accordance with the present disclosure.

FIG. 2 depicts a block diagram of an example system 200 to facilitate control of a touch device (e.g., the touch device 115) in accordance with the present disclosure. While describing FIG. 2, references may be made to FIGS. 3, 4A, 4B, 5A, 5B, 6A, 6B, 7A and 7B.

The system 200 may include a vehicle 202, which may be same as the vehicle 105. The vehicle 202 may include an automotive computer 204, a Vehicle Control Unit (VCU) 206, and a touch device management unit or "TDMU" 208 (same as the touch device management unit described above in conjunction with FIG. 1). The VCU 206 may include a plurality of Electronic Control Units (ECUs) 210 disposed in communication with the automotive computer 204.

The system 200 may further include a mobile device 212 or a user device 212 that may connect with the automotive computer 204 and/or the TDMU 208 by using wired and/or wireless communication protocols and transceivers. In some aspects, the mobile device 212 may be associated with the user 120. The mobile device 212 may communicatively couple with the vehicle 202 via one or more network(s) 214.

The network(s) 214 illustrates an example communication infrastructure in which the connected devices discussed in various embodiments of this disclosure may communicate. The network(s) 214 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the automotive computer 204 and/or the TDMU 208 may be installed in a vehicle engine compartment (or elsewhere in the vehicle 202), in accordance with the disclosure. Further, the automotive computer 204 may operate as a functional part of the TDMU 208. The automotive computer 204 may be or include an electronic vehicle controller, having one or more processor(s) 216 and a memory 218. Moreover, the TDMU 208 may be separate from the automotive computer 204 (as shown in FIG. 2) or may be integrated as part of the automotive computer 204.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable memory storing a touch device management program code. The memory 218 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In some aspects, the automotive computer 204 and/or the TDMU 208 may be disposed in communication with one or more server(s) 220 and the mobile device 212 via the network 214. In some aspects, the server(s) 220 may be part of a cloud-based computing infrastructure and may be associated with and/or include a Telematics Service Delivery Network (SDN) that provides digital data services to the vehicle 202 and other vehicles (not shown in FIG. 2) that may be part of a vehicle fleet. In additional aspects, the server 220 may store road information on which the vehicle 202 may be travelling and transmits the road information to the TDMU 208. In further aspects, the server 220 may store a mapping of road conditions with different touch device parameters, and transmit the mapping to the TDMU 208. The details of the mapping may be understood in conjunction with FIGS. 4A, 4B, 5A, 5B, 6A and 6B.

In accordance with some aspects, the VCU 206 may share a power bus with the automotive computer 204 and may be configured and/or programmed to coordinate the data between vehicle 202 systems, connected servers (e.g., the server(s) 220), and other vehicles (not shown in FIG. 2) operating as part of a vehicle fleet. The VCU 206 can include or communicate with any combination of the ECUs 210, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc.

The VCU 206 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging (LiDAR or "lidar") sensor, door sensors, proximity sensors, temperature sensors, weight sensors, vehicle wheel sensors, vehicle internal or external cameras, accelerometer(s), etc. The accelerometer(s) may be configured to measure vibration, shock, displacement, inclination, and tilt associated with the vehicle 202. In some aspects, inputs obtained by the accelerometer(s) may be used by the processor 216 to determine road condition associated with the road 110 on which the vehicle 202 may be travelling. For example, if the inputs obtained by the accelerometer(s) indicates vibrations in the vehicle greater than a predefined vibration threshold, the processor 216 may determine that the vehicle 202 may be travelling on a bumpy road. In addition, the vehicle camera may capture road images, and the processor 216 may use the captured road images to determine the road condition.

In some aspects, the VCU 206 may control vehicle 202 operational aspects and implement one or more instruction sets received from the mobile device 212, from one or more instruction sets stored in computer memory 218 of the automotive computer 204, including instructions operational as part of the TDMU 208.

The TCU 228 can be configured and/or programmed to provide vehicle connectivity to wireless computing systems onboard and off board the vehicle 202 and may include a Navigation (NAV) receiver 236 for receiving and processing a GPS signal (including map services which may indicate whether the vehicle 202 may be travelling on a road/street or driving off-road (i.e., road type)), a BLE® Module (BLEM) 238, a Wi-Fi transceiver, a ultra-wideband (UWB) transceiver, and/or other wireless transceivers (not shown in FIG. 2) that may be configurable for wireless communication between the vehicle 202 and other systems (e.g., a vehicle key fob, not shown in FIG. 2), computers, and modules. The TCU 228 may be disposed in communication with the ECUs 210 by way of a bus.

The ECUs 210 may control aspects of vehicle operation and communication using inputs from human drivers, inputs from an autonomous vehicle controller, the TDMU 208, and/or via wireless signal inputs received via the wireless connection(s) from other connected devices, such as the mobile device 212, the server(s) 220, among others.

The BCM 222 generally includes integration of sensors, vehicle performance indicators, and variable reactors associated with vehicle systems and may include processor-based power distribution circuitry that can control functions associated with the vehicle body such as lights, windows, security, camera(s), audio system(s), speakers, door locks and access control, and various comfort controls (including control of the touch device 115). The BCM 222 may also operate as a gateway for bus and network interfaces to interact with remote ECUs (not shown in FIG. 2).

The DAT controller 230 may provide Level-1 through Level-3 automated driving and driver assistance functionality that can include, for example, active parking assistance, vehicle backup assistance, adaptive cruise control, and/or lane keeping, among other features. The DAT controller 230 may also provide aspects of user and environmental inputs usable for user authentication.

In some aspects, the automotive computer 204 may connect with an infotainment system 240 that may include a touchscreen interface portion and may include voice recognition features, biometric identification capabilities that can identify users based on facial recognition, voice recognition, fingerprint identification, or other biological identification means. In other aspects, the infotainment system 240 may be configured to receive user instructions via the touchscreen interface portion, and/or display notifications, navigation maps, etc. on the touchscreen interface portion. In additional aspects, the infotainment system 240 may be a touch device (same as the touch device 115 described above in conjunction with FIG. 1) that may incorporate haptic and/or force touch technologies. As described in conjunction with FIG. 1, the touch device 115 may include a haptic component 242 and a force touch component 244.

The computing system architecture of the automotive computer 204, the VCU 206, and/or the TDMU 208 may omit certain computing modules. It should be readily understood that the computing environment depicted in FIG. 2 is an example of a possible implementation according to the present disclosure, and thus, it should not be considered limiting or exclusive.

In accordance with some aspects, the TDMU 208 may be integrated with and/or executed as part of the ECUs 210. The TDMU 208, regardless of whether it is integrated with the automotive computer 204 or the ECUs 210, or whether it operates as an independent computing system in the vehicle 202, may include a transceiver 246, a processor 248, and a computer-readable memory 250.

The transceiver 246 may be configured to receive information/inputs from one or more external devices or systems, e.g., the mobile device 212, the server(s) 220, and/or the like via the network 214. For example, the transceiver 246 may be configured to receive road information on which the vehicle 202 may be travelling from the server 220. In some aspects, the road information may include information indicating whether the road 110 may be smooth or bumpy. Further, the transceiver 246 may be configured to transmit signals, notifications or information (e.g., request signals) to the external devices or systems.

In addition, the transceiver 246 may be configured to receive information/inputs from vehicle 202 components such as the infotainment system 240 (or any other touch device 115 in the vehicle 202), the vehicle sensory system 234, the NAV receiver 236, and/or the like. Further, the transceiver 246 may be configured to transmit control signals, notifications to the vehicle 202 components such as the haptic component 242 and the force touch component 244 associated with the touch device 115.

The processor 248 and the memory 250 may be same as or similar to the processor 216 and the memory 218, respectively. Specifically, the processor 248 may utilize the memory 250 to store programs in code and/or to store data for performing aspects in accordance with the disclosure. The memory 250 may be a non-transitory computer-readable memory storing the touch device management program code.

The memory 250 may be configured to store road information received by the transceiver 246, and a mapping of road condition and parameters associated with the haptic component 242 and the force touch component 244 associated with the touch device 115 (that the memory 250 may receive from the server 220 via the transceiver 246). The road condition may include, for example, smooth road, bumpy road, etc. The parameters associated with the haptic component 242 may include, for example, intensity of haptic feedback. Further, the parameters associated with the force touch component 244 may include, for example, a minimum force requirement for touch device actuation, a minimum touch time duration on the touch device 115 for touch acceptance, and/or the like.

Figure 3:
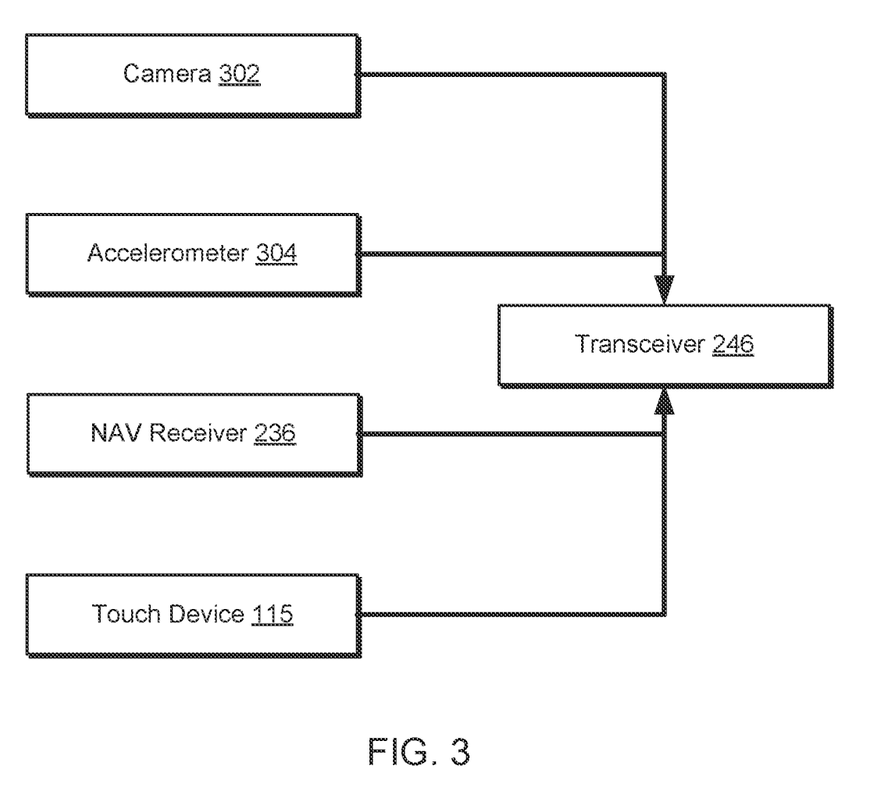
FIG. 3 depicts one or more inputs received by a vehicle transceiver in accordance with the present disclosure.

In operation, the transceiver 246 may receive the road information on which the vehicle 202 may be travelling/traversing from one or more information sources. Example information sources are shown in FIG. 3 as one or more vehicle camera(s) 302, a vehicle accelerometer 304, the NAV receiver 236 and the touch device 115.

In some aspects, the transceiver 246 may receive the road information from the vehicle sensory system 234 that includes the camera 302 and the accelerometer 304. For example, the transceiver 246 may receive road images captured by the camera 302, as a part of road information. In further aspects, the transceiver 246 may receive information associated with the vibration experienced by the vehicle 202 from the accelerometer 304, as a part of road information. In additional aspects, the transceiver 246 may receive information associated with road type (e.g., whether the road 110 may be smooth or bumpy) from the NAV receiver 236, as a part of road information. In some aspects, the NAV receiver 236 may receive such information from the server 220. Furthermore, the transceiver 246 may receive signal information associated with touch operation from the touch device 115, as a part of road information. The signal information may include a raw signal associated with a touch operation from the touch device 115 (via the transceiver 246), which may be used by the processor 248 to determine "noise" received on a touch surface, as described below.

The transceiver 246 may be configured to transmit the above-mentioned information to the processor 248, and also to the memory 250 for storage purpose. In some aspects, the transceiver 246 may receive such information at a predefined or predetermined frequency. In other aspects, the transceiver 246 may receive such information when the transceiver 246 transmits an information request to one or more components described above.

The processor 248 obtain the road information from the transceiver 246. The processor 248 may be configured to determine road condition associated with the road 110 based on the obtained road information. Specifically, the processor 248 may determine whether the road 110 on which the vehicle 202 may be travelling is smooth or bumpy. For example, the processor 248 may obtain the road images captured by the camera 302 (via the transceiver 246), perform image processing on the road images, and determine whether the road 110 may be smooth or bumpy based on the image processing. The processor 248 may be further configured to scale the road condition (e.g., smooth, less bumpy or more bumpy) based on the image processing. For example, the processor 248 may determine that the road may be 60% bumpy based on the image processing on the captured road images. In some aspects, the processor 248 may use Artificial Intelligence (AI) or machine learning based algorithms (that may be pre-stored in the memory 250) to determine the road condition from the road information.

In further aspects, the processor 248 may obtain information associated with vibration in the vehicle 202 from the accelerometer 304 (via the transceiver 246) and may determine road condition (e.g., road flatness) based on the vibration information. A person ordinarily skilled in the art may appreciate that the vibration in the vehicle 202 may increase when the road "bumpiness" increases or when the road 110 may be bumpy. Thus, the vibration in the vehicle 202 enables the processor 248 to determine whether the road 110 may be smooth, less bumpy or more bumpy.

In further aspects, the processor 248 may obtain road type information from the NAV receiver 236 and may determine the road condition based on the road type information. For example, the processor 248 may obtain a GPS location of the vehicle 202 and determine whether the vehicle 202 may be driving on a street/road or off-road. The processor 248 may determine that the road 110 may be bumpy (as the road condition) when the vehicle 202 may be traversing an off-road terrain. As described above, the processor 248 may be further configured to scale the road condition (e.g., smooth, less bumpy or more bumpy) based on the road information such as the road type information.

In additional aspects, the processor 248 may obtain the signal information (e.g., raw signal) associated with a touch operation from the touch device 115 (via the transceiver 246). Stated another way, the processor 248 may receive the signal information/raw signal when the user 120 touches the touch device 115. Responsive to obtaining the signal information, the processor 248 may analyze "noise" received on a touch surface associated with the touch device 115 based on the signal information. The processor 248 may then determine the road condition based on the noise analysis. Specifically, the processor 248 may analyze intensity of raw signal as a user finger touches on the touch surface, and determine noise intensity received at the touch surface. In some aspects, the noise may indicate the road condition. For example, the user 120 may touch the touch surface gently once to activate a certain function on the touch device 115 when the road 110 may be smooth, and hence the "noise" at the touch device 115 may be low. On the other hand, the user finger may bounce on the touch surface several times, or the user 120 may push hard on the touch surface for actuation when the road 110 may be bumpy, and hence the noise at the touch device 115 may be high. In addition, the user 120 may touch several times around a particular icon/button (and hence have a higher associated noise) before the user 120 makes it to the right position when the vehicle 202 may be travelling on a bumpy road.

In some aspects, the processor 248 may obtain the road information from more than one component (e.g., the camera 302, the accelerometer 304, the NAV receiver 236 and/or the touch device 115), correlate the road information obtained from the components, and determine the road condition based on the correlation.

The processor 248 may be further configured to adjust parameters associated with the haptic component 242 and/or the force touch component 244 based on the determined road condition. As described above, the parameters may include, but are not limited to, intensity of haptic feedback associated with the haptic component 242, a minimum force requirement for actuation and/or time duration of touch acceptance associated with the force touch component 244, etc. The processor 248 may perform parameter adjustment automatically based on the determined road condition. For example, the processor 248 may automatically adjust the parameters when the vehicle 202 transitions from a smooth road to a bumpy road, and vice-versa. In some aspects, the processor 248 may make the adjustment linearly. In other aspects, the processor 248 may make the adjustment non-linearly.

In an exemplary aspect, the processor 248 may decrease the intensity of haptic feedback when the road condition indicates that the road 110 may be smooth and may increase the intensity of haptic feedback when the road condition indicates that the road 110 may be bumpy. Further, the processor 248 may decrease the minimum force requirement for actuation when the road condition indicates that the road 110 may be smooth and may increase the minimum force requirement for actuation when the road condition indicates that the road 110 may be bumpy. Furthermore, the processor 248 may decrease the minimum time duration of touch acceptance when the road condition indicates that the road 110 may be smooth and may increase the minimum time duration of touch acceptance when the road condition indicates that the road 110 may be bumpy.

The processor 248 provides various advantages to the user 120 by adjusting the parameters described above. For example, the processor 248 may decrease the haptic feedback intensity when the vehicle 202 may be travelling on a smooth road, for which the user 120 may require only slight haptic feedback. Similarly, the processor 248 may increase the haptic feedback intensity when the vehicle 202 may be travelling on a bumpy road, for which the user 120 may require strong haptic feedback. By making these adjustments automatically, the processor 248 enhances user convenience of operating the touch device 115. In a similar manner, the processor 248 may increase or decrease the minimum force requirement and time duration of touch acceptance based on the road conditions to enhance user experience of operating the touch device 115.

In some aspects, the processor 248 may use a mapping (that may be pre-stored in the memory 250 or the server 220) of road condition with parameters associated with the haptic component 242 and the force touch component 244 to adjust the parameters. Example mapping of road conditions with one or more parameters is depicted in FIGS. 4A, 4B, 5A, 5B, 6A and 6B, as X-Y graphs. The X-Y graphs are depicted just for illustrative purpose, and should not be construed as limiting the present disclosure scope.

Figure 4A:
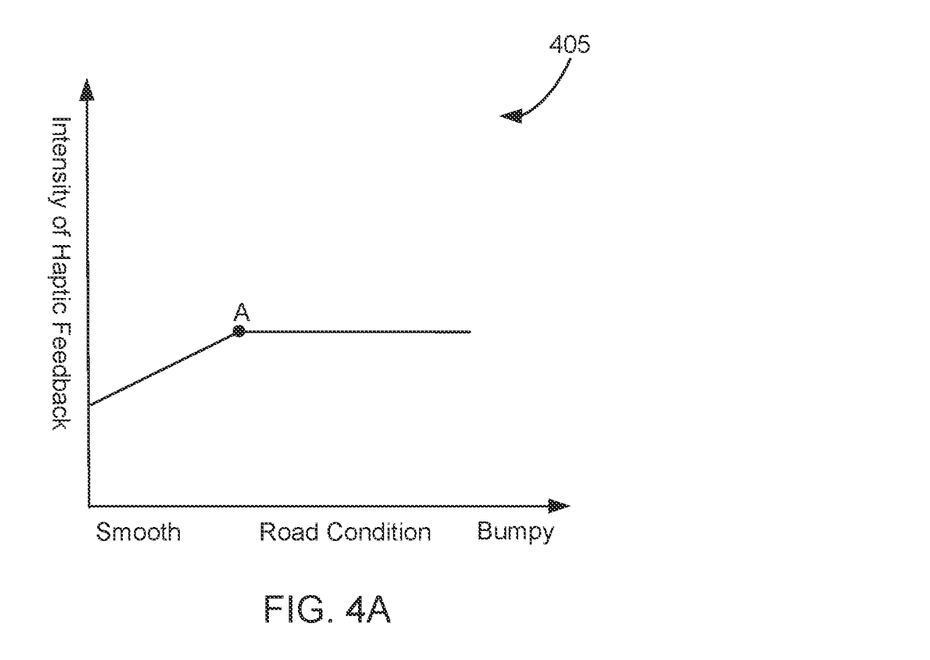
FIGS. 4A and 4B depict mappings of a first parameter with road condition in accordance with the present disclosure.
Figure 4B:
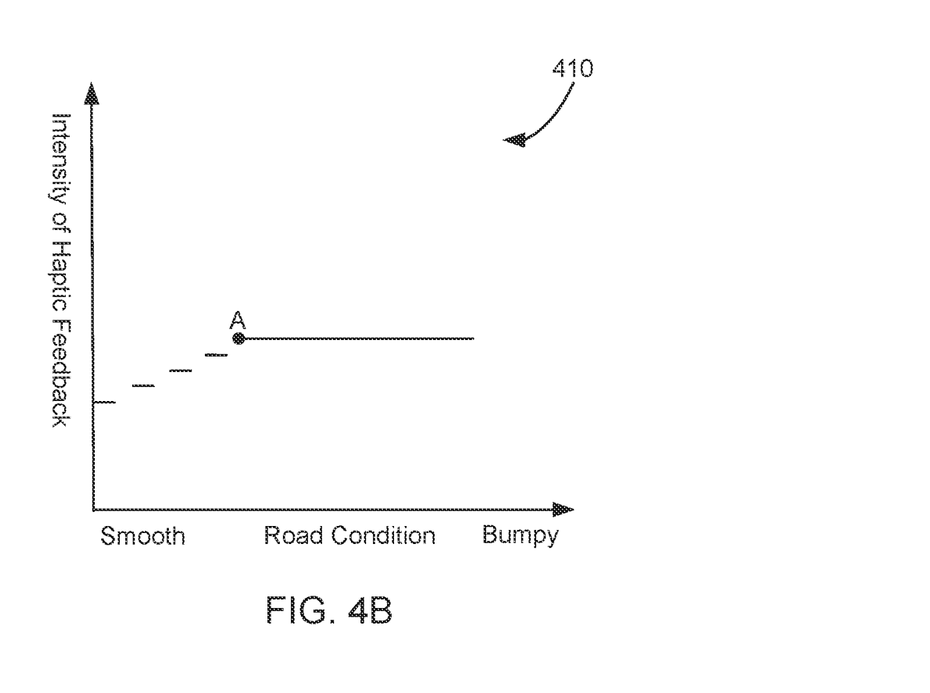

FIGS. 4A and 4B depict example mappings of a first parameter with the road condition in accordance with the present disclosure. The first parameter may be intensity of haptic feedback associated with the haptic component 242. FIGS. 4A and 4B depict graphs 405 and 410 (e.g., X-Y graphs) in which the road condition is represented on X axis and the first parameter is represented on Y axis. Specifically, FIG. 4A depicts a linear relationship between the first parameter and the road condition, and FIG. 4B depicts a non-linear relationship between the first parameter and the road condition.

In some aspects, FIG. 4A depicts a first manner in which the processor 248 changes intensity of haptic feedback based on the road condition, and FIG. 4B depicts a second manner in which the processor 248 changes the intensity of haptic feedback based on the road condition. The first manner illustrates that the processor 248 increases the intensity linearly as the road bumpiness increases. Specifically, the processor 248 increases the intensity till the road bumpiness reaches a point A (as depicted in FIG. 4A). At this point, the processor 248 may have increased the intensity to a maximum value/limit. Beyond this point, the processor 248 maintains the intensity (or keeps the intensity constant) even if the road bumpiness increases. The processor 248 may decrease the intensity when the vehicle 202 transitions from a bumpy road to a smooth road.

The second manner illustrates that the processor 248 increases the intensity non-linearly as the road bumpiness increases. Specifically, the processor 248 increases the intensity step-wise till the road bumpiness reaches to the point A (as depicted in FIG. 4B). At this point, the processor 248 may have increased the intensity to the maximum value/limit. Beyond this point, the processor 248 maintains the intensity (or keeps the intensity constant) even if the road bumpiness increases. The processor 248 may decrease the intensity when the vehicle 202 transitions from a bumpy road to a smooth road in a similar non-linear manner.

Figure 5A:
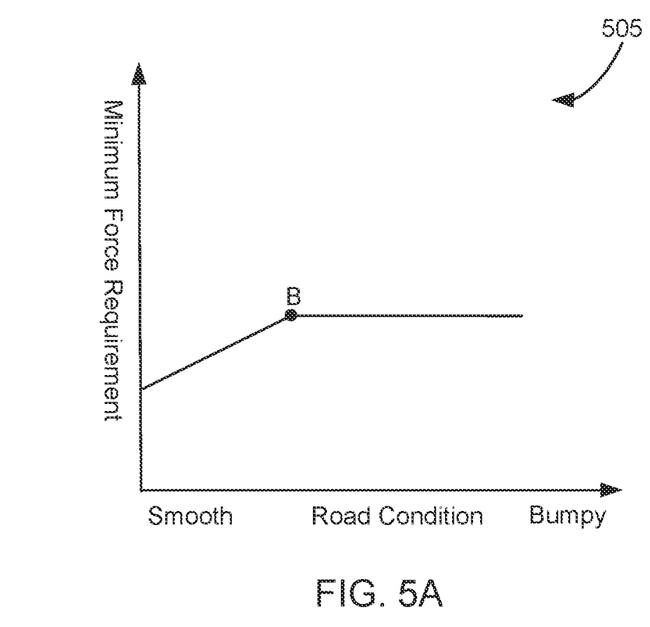
FIGS. 5A and 5B depict mappings of a second parameter with road condition in accordance with the present disclosure.
Figure 5B:
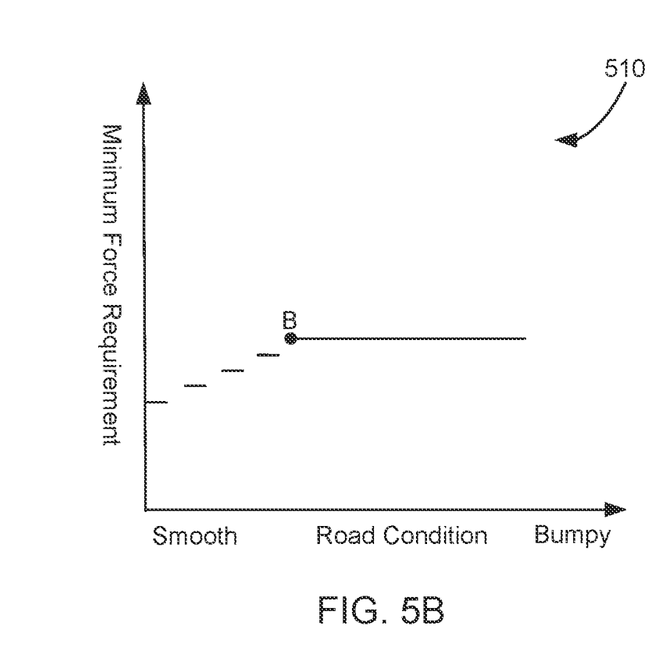

FIGS. 5A and 5B depict example mappings of a second parameter with the road condition in accordance with the present disclosure. The second parameter may be the minimum force requirement for touch device actuation, which may be associated with the force touch component 244. FIGS. 5A and 5B depict graphs 505 and 510 in which the road condition is represented on X axis and the second parameter is represented on Y axis. FIG. 5A depicts a linear relationship between the second parameter and the road condition and FIG. 5B depicts a non-linear relationship between the second parameter and the road condition.

In some aspects, FIG. 5A depicts a first manner in which the processor 248 changes a minimum force requirement based on the road condition, and FIG. 5B depicts a second manner in which the processor 248 changes the minimum force requirement based on the road condition. The first manner illustrates that the processor 248 increases the minimum force requirement linearly as the road bumpiness increases. Specifically, the processor 248 increases the minimum force requirement till the road bumpiness reaches to a point B (as depicted in FIG. 5A). At this point, the processor 248 may have increased the minimum force requirement to a maximum value/limit. Beyond this point, the processor 248 maintains the minimum force requirement (or keeps the minimum force requirement constant) even if the road bumpiness increases. The processor 248 may decrease the minimum force requirement when the vehicle 202 transitions from a bumpy road to a smooth road.

The second manner illustrates that the processor 248 increases the minimum force requirement non-linearly as the road bumpiness increases. Specifically, the processor 248 increases the minimum force requirement step-wise till the road bumpiness reaches to the point B (as depicted in FIG. 5B). At this point, the processor 248 may have increased the minimum force requirement to the maximum value/limit. Beyond this point, the processor 248 maintains the minimum force requirement (or keeps the minimum force requirement constant) even if the road bumpiness increases. The processor 248 may decrease the minimum force requirement when the vehicle 202 transitions from a bumpy road to a smooth road in a similar non-linear manner.

Figure 6A:
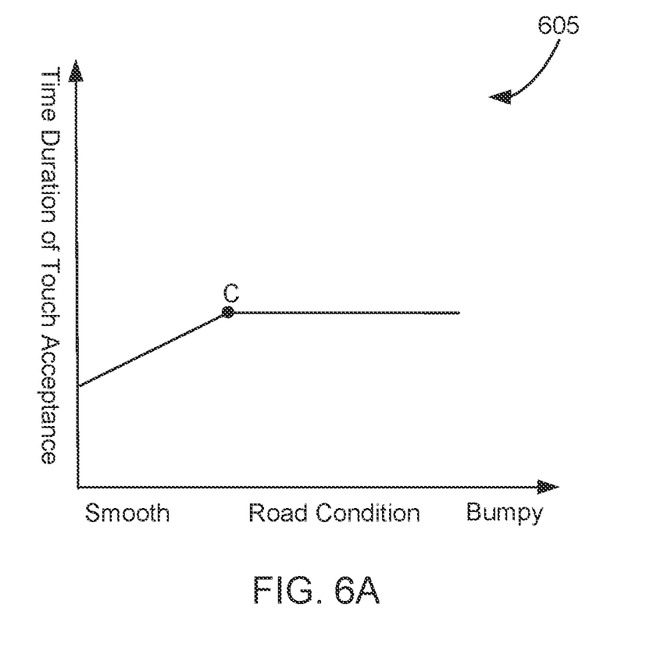
FIGS. 6A and 6B depict mappings of a third parameter with road condition in accordance with the present disclosure.
Figure 6B:
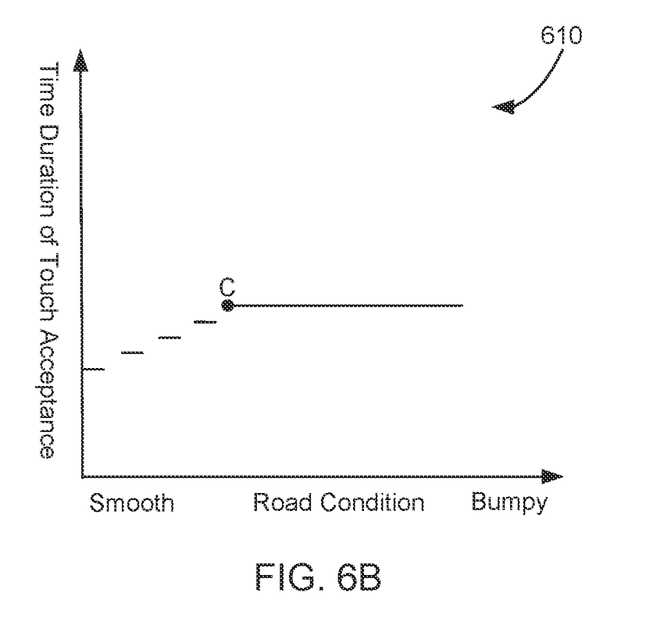

FIGS. 6A and 6B depict example mappings of a third parameter with the road condition in accordance with the present disclosure. The third parameter may be a minimum time duration of touch acceptance (or time duration of touch acceptance) to actuate the touch device 115, which may be associated with the force touch component 244. FIGS. 6A and 6B depict graphs 605 and 610 in which the road condition is represented on X axis and the third parameter is represented on Y axis. FIG. 6A depicts a linear relationship between the third parameter and the road condition and FIG. 6B depicts a non-linear relationship between the third parameter and the road condition.

In some aspects, FIG. 6A depicts a first manner in which the processor 248 changes a time duration of touch acceptance based on the road condition, and FIG. 6B depicts a second manner in which the processor 248 changes the time duration of touch acceptance based on the road condition. The first manner illustrates that the processor 248 increases the time duration of touch acceptance linearly as the road bumpiness increases. Specifically, the processor 248 increases the time duration of touch acceptance till the road bumpiness reaches to a point C (as depicted in FIG. 6A). At this point, the processor 248 may have increased the time duration of touch acceptance to a maximum value/limit. Beyond this point, the processor 248 maintains the time duration of touch acceptance (or keeps the time duration of touch acceptance constant) even if the road bumpiness increases. The processor 248 may decrease the time duration of touch acceptance when the vehicle 202 transitions from a bumpy road to a smooth road.

The second manner illustrates that the processor 248 increases the time duration of touch acceptance non-linearly as the road bumpiness increases. Specifically, the processor 248 increases the time duration of touch acceptance step-wise till the road bumpiness reaches to the point C (as depicted in FIG. 6B). At this point, the processor 248 may have increased the time duration of touch acceptance to a maximum value/limit. Beyond this point, the processor 248 maintains the time duration of touch acceptance (or keeps the time duration of touch acceptance constant) even if the road bumpiness increases. The processor 248 may decrease the time duration of touch acceptance when the vehicle 202 transitions from a bumpy road to a smooth road in a similar non-linear manner.

Figure 7A:
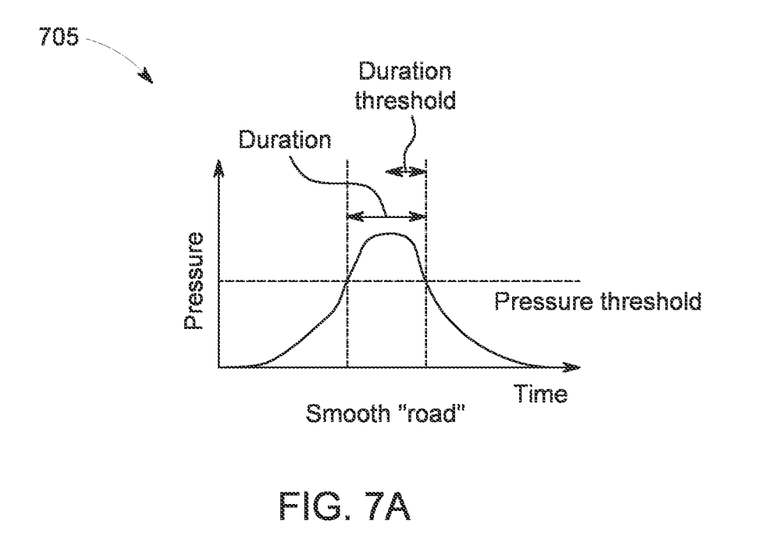
FIGS. 7A and 7B depict snapshots of maximum permissible pressure variability for the touch device for a smooth road and a bumpy road in accordance with the present disclosure.
Figure 7B:
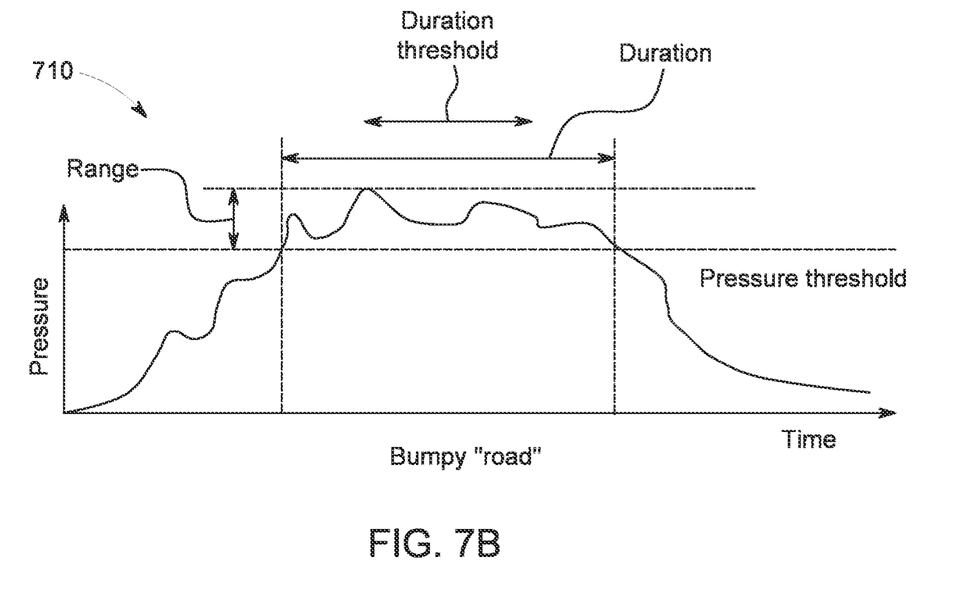

FIGS. 7A and 7B depict example snapshots of maximum permissible pressure variability for the touch device 115 for a smooth road and a bumpy road in accordance with the present disclosure. FIGS. 7A and 7B depict graphs 705 and 710 in which X-axis denotes time and Y-axis denotes pressure applied by the user 120 on the touch screen interface associated with the touch device 115. A person ordinarily skilled in the art may appreciate that when the vehicle 202 may be travelling on a smooth road, the user 120 may apply a uniform pressure above a predefined pressure threshold on the touch device 115 for a predefined time duration to activate a function associated with the touch device 115. On the other hand, when the vehicle 202 may be travelling on a bumpy road, the user 120 may face difficulty in achieving a precise controlled touch and may hence apply non-uniform pressure on the touch device 115.

Consequently, to enhance user convenience of operating the touch device 115, the processor 248 may decrease a permissible time duration for which the user 120 may apply variable pressure above the pressure threshold on the touch device 115 to activate the function when the vehicle 202 may be travelling on a smooth road, as shown in FIG. 7A. Stated another way, the processor 248 may decrease the maximum permissible "pressure variability" for the touch device 115 when the vehicle 202 may be travelling on a smooth road. On the other hand, the processor 248 may increase the permissible time duration for which the user 120 may apply variable pressure above the pressure threshold on the touch device 115 to activate the function when the vehicle 202 may be travelling on a bumpy road, as shown in FIG. 7B. Stated another way, the processor 248 may increase the maximum permissible pressure variability for the touch device 115 when the vehicle 202 may be travelling on a bumpy road.

Figure 8:
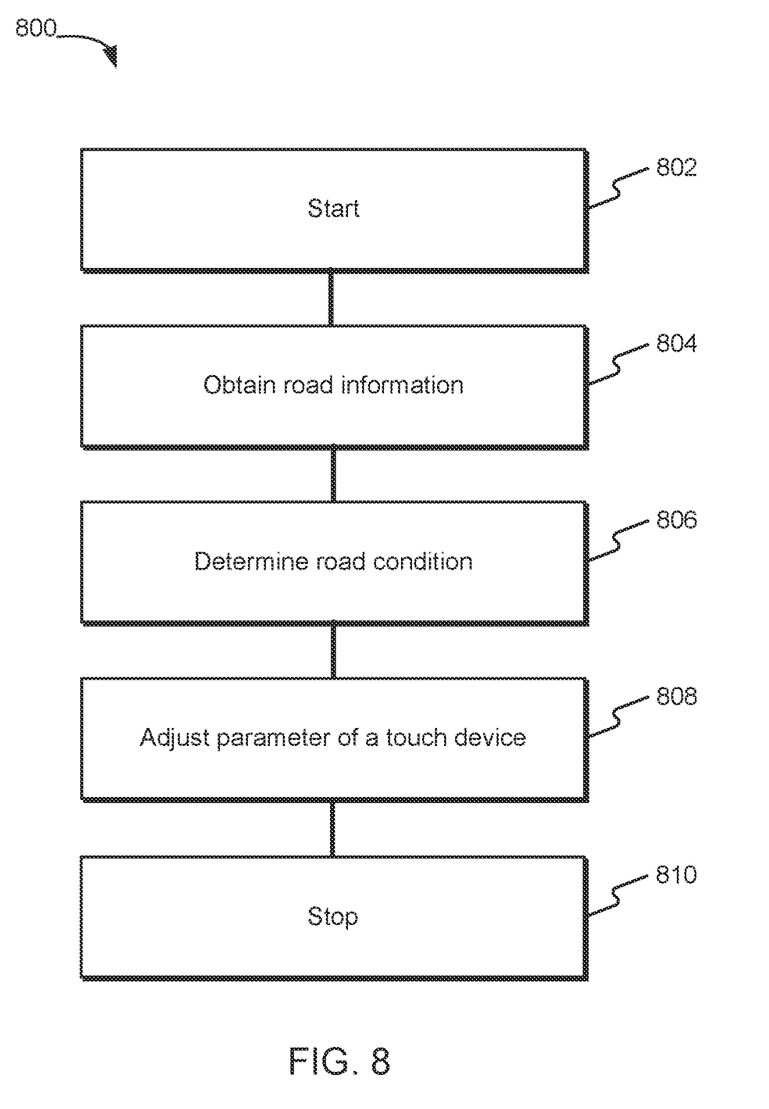
FIG. 8 depicts a flow diagram of a method to facilitate control of a touch device in accordance with the present disclosure.

FIG. 8 depicts a flow diagram of an example method 800 to facilitate control of a touch device in accordance with the present disclosure. FIG. 8 may be described with continued reference to prior figures, including FIGS. 1, 2, 3, 4A, 4B, 5A, 5B, 6A, 6B, 7A, and 7B. The following process is exemplary and not confined to the steps described hereafter. Moreover, alternative embodiments may include more or less steps that are shown or described herein and may include these steps in a different order than the order described in the following example embodiments.

The method 800 starts at step 802. At step 804, the method 800 may include obtaining, by the processor 248, road information associated with the road 110 on which the vehicle 202 may be travelling. As described above, the transceiver 246 may receive the road information from vehicle components (such as the vehicle sensory system 234) or external devices (such as the server 220). The transceiver 246 may receive the road information at a predetermined frequency or when the transceiver 246 transmits a request to the vehicle components or the server 220 to obtain the road information.

At step 806, the method 800 may include determining, by the processor 248, road condition based on the road information. Specifically, the processor 248 may determine road bumpiness level or scale on the road information. The details of such determination are described above in conjunction with FIGS. 1-7B.

At step 808, the method 800 may include adjusting, by the processor 248, parameter associated with the touch device 115 based on the road condition. As described above, the touch device 115 may include the haptic component 242 and the force touch component 244. The processor 248 may adjust the parameter associated with the haptic component 242 and/or the force touch component 244 based on the determined road condition. The parameter may include, but is not limited to, an intensity of haptic feedback (associated with the haptic component 242), a minimum force requirement for actuation and/or a time duration of touch acceptance (associated with the force touch component 244).

The method 800 may end at step 810.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
a touch device configured to receive user inputs, wherein the touch device comprises a haptic component configured to provide haptic feedback to a user and a force touch component configured to detect force applied by the user on the touch device and actuate the touch device;
a transceiver configured to receive road information associated with a road on which the vehicle is traversing; and
a processor communicatively coupled to the touch device and the transceiver, wherein the processor is configured to:
obtain the road information from the transceiver;
determine road condition based on the road information; and adjust a parameter associated with the haptic component or the force touch component based on the road condition.

2. The vehicle of claim 1, wherein the processor adjusts the parameter by automatically adjusting the parameter linearly or non-linearly.

3. The vehicle of claim 1, wherein the processor adjusts the parameter by decreasing an intensity of haptic feedback of the touch device when the road condition indicates that the road is smooth and increasing the intensity of haptic feedback of the touch device when the road condition indicates that the road is bumpy.

4. The vehicle of claim 1, wherein the processor adjusts the parameter by decreasing a minimum force requirement for actuation of the touch device when the road condition indicates that the road is smooth and increasing the minimum force requirement for actuation of the touch device when the road condition indicates that the road is bumpy.

5. The vehicle of claim 1, wherein the processor adjusts the parameter by decreasing a time duration of touch acceptance of the touch device when the road condition indicates that the road is smooth and increasing the time duration of touch acceptance of the touch device when the road condition indicates that the road is bumpy.

6. The vehicle of claim 1 further comprising an accelerometer configured to detect a vibration in the vehicle, wherein the transceiver is communicatively coupled with the accelerometer, and wherein the road information comprises information associated with the vibration.

7. The vehicle of claim 1 further comprising a camera configured to capture road images, wherein the transceiver is communicatively coupled with the camera, and wherein the road information comprises the road images.

8. The vehicle of claim 1, further comprises a navigation receiver configured to receive the road information from a server, wherein the transceiver is communicatively coupled with the navigation receiver.

9. The vehicle of claim 1, wherein the transceiver is communicatively coupled with the touch device, and wherein the road information comprises signal information associated with a touch operation performed by the user on the touch device.

10. The vehicle of claim 9, wherein the processor is further configured to:
obtain the signal information from the transceiver;
analyze noise received on a touch surface associated with the touch device based on the signal information; and
determine the road condition based on analyzing the noise.

11. The vehicle of claim 1 further comprising a memory, wherein the processor is further configured to:
obtain a pre-stored mapping of the road condition and the parameter associated with the haptic component and the force touch component from the memory responsive to determining the road condition; and
adjust the parameter based on the pre-stored mapping.

12. A method to manage a touch device in a vehicle, the method comprising:
obtaining road information associated with a road on which the vehicle is traversing;
determining road condition based on the road information; and
adjusting a parameter associated with a haptic component or a force touch component based on the road condition, wherein the haptic component and the force touch component are associated with the touch device, wherein the touch device is configured to receive user inputs, and wherein the haptic component is configured to provide haptic feedback to a user and the force touch component is configured to detect force applied by the user on the touch device and actuate the touch device.

13. The method of claim 12, wherein adjusting the parameter comprises automatically adjusting the parameter linearly or non-linearly.

14. The method of claim 12, wherein adjusting the parameter comprises decreasing an intensity of haptic feedback of the touch device when the road condition indicates that the road is smooth and increasing the intensity of haptic feedback of the touch device when the road condition indicates that the road is bumpy.

15. The method of claim 12, wherein adjusting the parameter comprises decreasing a minimum force requirement for actuation of the touch device when the road condition indicates that the road is smooth and increasing the minimum force requirement for actuation of the touch device when the road condition indicates that the road is bumpy.

16. The method of claim 12, wherein adjusting the parameter comprises decreasing a time duration of touch acceptance of the touch device when the road condition indicates that the road is smooth and increasing the time duration of touch acceptance of the touch device when the road condition indicates that the road is bumpy.

17. The method of claim 12, wherein the road information comprises information associated with vibration detected by an accelerometer.

18. The method of claim 12, wherein the road information comprises road images captured by a camera.

19. The method of claim 12, wherein the road information comprises signal information associated with a touch operation performed by the user on the touch device.

20. A non-transitory computer-readable storage medium having instructions stored thereupon which, when executed by a processor, cause the processor to:
obtain road information associated with a road on which a vehicle is traversing;
determine road condition based on the road information; and
adjust a parameter associated with a haptic component or a force touch component based on the road condition, wherein the haptic component and the force touch component are associated with a touch device, wherein the touch device is configured to receive user inputs, and wherein the haptic component is configured to provide haptic feedback to a user and the force touch component is configured to detect force applied by the user on the touch device and actuate the touch device.

* * * * *